United States Patent
Gibart et al.

(10) Patent No.: US 11,249,839 B1
(45) Date of Patent: Feb. 15, 2022

(54) METHOD AND APPARATUS FOR MEMORY ERROR DETECTION

(71) Applicant: Rockwell Automation Technologies, Inc., Mayfield Heights, OH (US)

(72) Inventors: Anthony G. Gibart, New Berlin, WI (US); Joseph P. Izzo, New Berlin, WI (US); Jonathan R. Engdahl, Chardon, OH (US); Benjamin H. Nave, Shaker Height, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/993,986

(22) Filed: Aug. 14, 2020

(51) Int. Cl.
*G06F 11/00* (2006.01)
*G06F 11/10* (2006.01)

(52) U.S. Cl.
CPC ................ *G06F 11/1004* (2013.01)

(58) Field of Classification Search
None
See application file for complete search history.

(56) References Cited

U.S. PATENT DOCUMENTS

| | | | |
|---|---|---|---|
| 6,757,766 B1 | 6/2004 | Hutner et al. | |
| 7,543,216 B1* | 6/2009 | Plants | G01R 31/318519 714/718 |
| 7,870,299 B1* | 1/2011 | Sorensen | G06F 11/1004 710/2 |
| 8,332,722 B1* | 12/2012 | Rojas | H03M 13/3776 714/758 |
| 2003/0131197 A1 | 7/2003 | Morrison | |
| 2008/0147908 A1* | 6/2008 | Lahti | G06F 11/1004 710/23 |
| 2010/0188972 A1* | 7/2010 | Knapp | H04L 12/437 370/226 |
| 2012/0324294 A1* | 12/2012 | Yamada | G06F 11/1008 714/42 |

(Continued)

OTHER PUBLICATIONS

J. Kim, M. Sullivan, S. Lym and M. Erez, "All-Inclusive ECC: Thorough End-to-End Protection for Reliable Computer Memory," 2016 ACM/IEEE 43rd Annual International Symposium on Computer Architecture (ISCA), 2016, pp. 622-633, doi: 10.1109/ISCA.2016.60. (Year: 2016).*

(Continued)

*Primary Examiner* — Daniel F. McMahon
(74) *Attorney, Agent, or Firm* — Boyle Fredrickson, SC (57) ABSTRACT

A system with multiple processing domains sharing a memory resource accessed via a shared memory controller detects a memory error. As data is written to the shared memory resource, each processing domain generates a diagnostic code as a function of the data, the memory address for the data, and of a unique identifier corresponding to the processing domain. The diagnostic code is stored with the data for verification when the data is read back. As the data is read back, the processing domain separates the diagnostic code from the data being read and generates another diagnostic code in the same manner as the original diagnostic code. The other diagnostic code is compared to the initial diagnostic code. If both diagnostic codes are the same, the processing domain can be confident that the data read from the shared memory resource is the same as the data that was originally written.

19 Claims, 2 Drawing Sheets

(56) References Cited

U.S. PATENT DOCUMENTS

| | | |
|---|---|---|
| 2016/0034368 A1 | 2/2016 | Nishii et al. |
| 2018/0018221 A1* | 1/2018 | Magro .................... G06F 11/10 |
| 2018/0067684 A1* | 3/2018 | Benisty ............... G06F 11/1048 |
| 2018/0247082 A1* | 8/2018 | Durham .................. G06F 21/57 |
| 2019/0340379 A1* | 11/2019 | Beecham ............ G06F 16/9014 |
| 2020/0272533 A1* | 8/2020 | Privitt ................. G06F 11/0772 |
| 2021/0049062 A1* | 2/2021 | Balakrishnan ...... G06F 11/0772 |

OTHER PUBLICATIONS

J. Yoo, S. Yoo and K. Choi, "Active Memory Processor for Network-on-Chip-Based Architecture," in IEEE Transactions on Computers, vol. 61, No. 5, pp. 622-635, May 2012, doi: 10.1109/TC.2011.66. (Year: 2012).*

Schiller, Frank, Prof.-Dr.-Ing.; "Realizing Safety Applications with the Industrial PC"; PC Control Magazine—25 Years of PC Control; Aug. 2011; (3) pages.

Rockwell Automation—ALLEN-BRADLEY; "Guard Logix Controller System Reference Manual"; Rockwell Automation Publication 1756-RM093J-EN-P dated Apr. 2018; www.rockwellautomation.com—(116) pages.

Extended European Search Report dated Nov. 18, 2021; Application No. 21174358.8-1224—(13) pages.

\* cited by examiner

METHOD AND APPARATUS FOR MEMORY ERROR DETECTION

BACKGROUND INFORMATION

The subject matter disclosed herein relates to detecting a memory error in a system with multiple processing domains, and, more specifically, to an industrial controller configured to meet safety integrity level three (SIL-3) functional safety with a single processor chip.

Industrial controllers are special-purpose computers used in controlling industrial processes. Under the direction of a stored control program, an industrial controller examines a series of inputs reflecting the status of the controlled process and changes a series of outputs controlling the process. The inputs and outputs may be binary, that is, on or off, or analog, providing a value within a substantially continuous range. The inputs may be obtained from sensors attached to the controlled process, and the outputs may be signals to actuators on the controlled process.

"Safety industrial control systems" are industrial control systems intended to ensure the safety of humans working in the environment of an industrial process. Such systems may include the electronics associated with emergency-stop buttons, light curtains, and other machine lockouts. Safety industrial control systems are not optimized for "availability", that is being able to function for long periods of time without error, but rather for "safety" which is being able to accurately detect an operating condition requiring a shut down. Safety industrial controllers normally provide a predetermined safe state for their outputs upon a safety shutdown, the predetermined values of these outputs being intended to put the industrial process into its safest static mode.

Safety industrial control systems may be associated with a "safety integrity level" (SIL) indicating a given amount of risk reduction. Standard IEC EN 61508 defines four SIL levels of SIL-1 to SIL-4 with higher numbers representing higher amounts of risk reduction. To achieve SIL-3 functional safety, high diagnostic coverage of critical components is required such that a failure of a critical component does not go undetected.

A common method for providing the required diagnostic coverage is to provide redundant components. Each component is configured to generate an identical signal, execute identical processing steps, or the like. While one of the components may be selected as an active component and may be configured to interface with the controlled machine or process, both the active component and a backup component operate in tandem and operation of the components may be compared to each other. A comparison of signals generated or processing steps executed should return identical results if both components are operating normally. A difference between the operation of the two components indicates failure of one of the components and the system may take the necessary steps to enter a safe operating state.

The redundancy involved with providing safety systems is relatively expensive and accordingly there is considerable interest in lowering the price point of such systems such as could increase their relative availability and thus overall safety of the community. One significant source of cost is the need for multiple microprocessors. Recent processor architectures used in industrial controllers have moved to "multicore" architectures in which multiple processing cores are contained inexpensively on a single integrated circuit die.

The use of multiple processing cores on a single chip does not, however, eliminate all redundancy associated with multiple microprocessors. Accompanying multiple microprocessors are similarly redundant memory devices as well as memory controllers interconnected between the microprocessor and the memory device. In order to maintain redundancy, each processing core on a single integrated circuit die would still require a separate memory controller and separate memory. The memory controller is a power intensive device and the redundant memory devices require more physical space on a circuit board than a single memory device having similar storage capacity.

Thus, it would be desirable to provide an improved system for managing memory usage for multiple processing domains.

BRIEF DESCRIPTION

According to one embodiment of the invention, a method for detecting a memory error includes writing data to a memory address in a shared memory resource from a first processing domain, generating a diagnostic code with the first processing domain as a function of the data and of the memory address, and appending the diagnostic code to the data such that the diagnostic code is written in the shared memory resource with the corresponding data. The data and the diagnostic code are read from the shared memory resource back to the first processing domain, and the first processing domain verifies that the data read from the shared memory resource matches the data written to the shared memory resource.

According to another embodiment of the invention, an apparatus for detecting a memory error includes a shared memory resource configured to store data, a memory controller, a first processing domain, and a second processing domain. The memory controller is configured to manage reading the data from and writing the data to the shared memory resource. The first processing domain is in communication with the memory controller and is configured to write the data to the shared memory resource via the memory controller, generate a first diagnostic code corresponding to the first processing domain, the data to be written, and to a memory address at which the data is to be written, and append the first diagnostic code to the data as it is written to the shared memory resource. The second processing domain is in communication with the memory controller and is configured to write the data to the shared memory resource via the memory controller, generate a second diagnostic code corresponding to the second processing domain, the data to be written, and to a memory address at which the data is to be written, and append the second diagnostic code to the data as it is written to the shared memory resource. Either the first or the second processing domain is further configured to read the data from the shared memory resource via the memory controller, and verify that the data read from the shared memory resource matches the data written to the shared memory resource.

According to still another embodiment of the invention, a method for detecting a memory error writes data to a memory address in a shared memory resource via a shared memory controller from either a first processing domain or a second processing domain and appends a diagnostic code to the data as the data is written by either the first processing domain or the second processing domain. The diagnostic code is generated as a function of the data, the memory address, and the corresponding processing domain from which it is written. The data is read from the memory address in the shared memory resource with the corresponding processing domain that wrote the data to the memory address, and the data read from the memory address in the shared memory resource is verified that it matches the data written to the memory address using the diagnostic code appended to the data.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein discloses an improved system for managing memory usage for multiple processing domains. More specifically, an improved method and apparatus is described for detecting a memory error in a system with multiple processing domains on a single integrated circuit die, where each of the processing domains utilizes a shared memory resource accessed via a shared memory controller. Each processing domain issues read and write commands to the shared memory controller for storing data in and reading data from the shared memory resource. As data is written to the shared memory resource, the processing domain generates a diagnostic code that may be used when reading the data back from the shared memory resource to verify that the data read is the same as the data that was written.

The diagnostic code is generated as a function of the data being written, the memory address to which the data is being written, and of a unique identifier corresponding to the processing domain which is writing the data. According to one embodiment of the invention, a checksum, such as a cyclic redundancy check (CRC), may be performed on the data and on the address within the shared memory resource to which the data is to be written. A CRC checksum is generated by an algorithm which receives data to be stored as an input and passes the data through a function, such as a polynomial function which outputs a unique signature based on the data received and on the function generating the signature. By including the address at which the data is to be written, the signature will be different than a signature generated solely based on the data. By further incorporating a unique identifier corresponding to the processing domain, identical data written to the same address by each processing domain would still generate a unique checksum for each processing domain. Optionally, it is contemplated that each processing domain may utilize a unique polynomial or other processing algorithm by which the checksum is generated. In either event, the resulting diagnostic code is a function of the processing domain which generated the code. The diagnostic code is stored with the data in the shared memory for verification when the data is read back from the shared memory resource.

When the data is read back from the shared memory resource, the processing domain separates the diagnostic code and the data being read. The processing domain generates another diagnostic code as a function of the data being read, the memory address from which the data is being read, and of the unique identifier corresponding to the processing domain which is reading the data. Inclusion of the memory address in generation of the diagnostic code allows the processing domain to check, for example, whether another set of data was erroneously written by the memory controller to that address. Because the diagnostic code includes the memory address, data that should have been written to a different address will include a diagnostic code that was generated as a function of the different address. Even if identical data intended for a different memory location is written to a particular address, the diagnostic code will correspond to the different memory address and the error made by the memory controller in writing data to an incorrect memory location will be detected when reading the data. Similarly, including a unique identifier and/or using a unique algorithm by which the diagnostic code is generated within each processing domain ensures that only the domain that wrote the data to the shared memory resource will be able to read the data from the memory resource. The other diagnostic code is generated in an identical manner to the initial diagnostic code as the data is read from the shared memory resource. The other diagnostic code is then compared to the initial diagnostic code. If both diagnostic codes are the same, the processing domain can be confident that the data read from the shared memory resource is the same as the data that was originally written.

Figure 1:
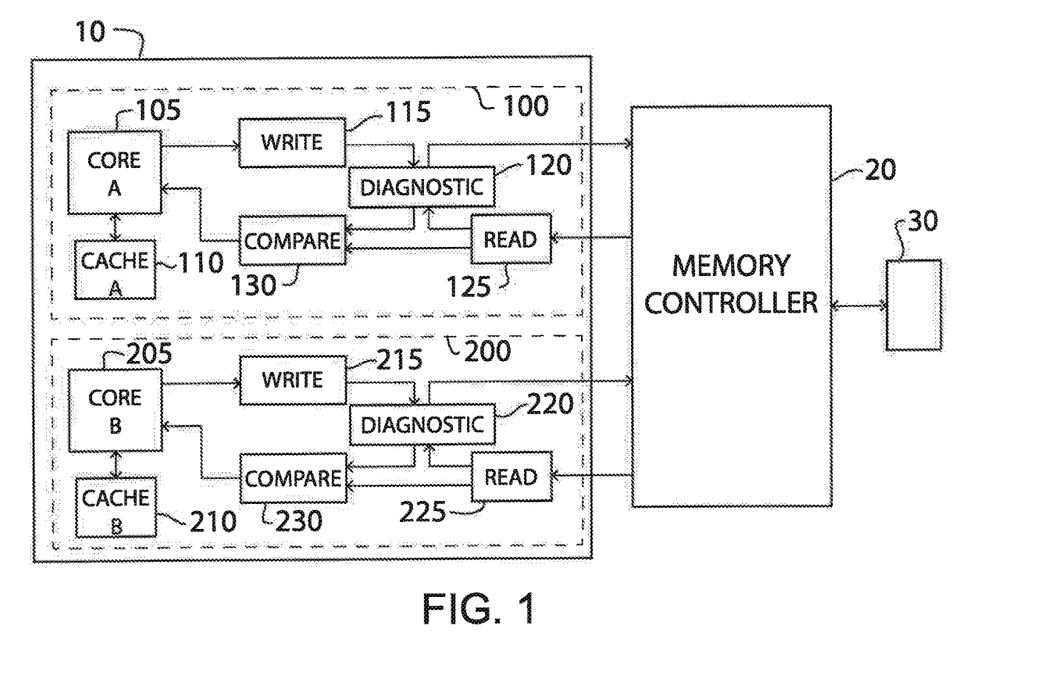
FIG. 1 is a block diagram representation of an exemplary multicore processor incorporating one embodiment of the present invention.

Turning initially to FIG. 1, an exemplary multicore microprocessor 10 incorporating one embodiment of the present invention is illustrated. According to the illustrated embodiment, the microprocessor 10 includes a first processing domain 100 and a second processing domain 200. The first processing domain 100 includes a first processor core 105, and the second processing domain 200 includes a second processor core 205. Although, the microprocessor 10 is shown with two cores 105, 205 and two processing domains 100, 200, this is for ease of illustration and is not intended to be limiting. It is contemplated that the microprocessor 10 may include more than two cores and processing domains. Each processing domain 100, 200 further includes a local cache memory 110, 210. The first processor core 105 can read from and write to the first cache 110, and the second processor core 205 can read from and write to the second cache 210.

Each processing domain 100, 200 is also in communication with a shared memory resource 30 via a common memory controller 20. Although illustrated as a single block, it is contemplated that the shared memory resource 30 may be a single memory chip or multiple memory chips each in communication with the memory controller 20. The first processing domain 100 includes a first write channel 115 receiving data from the first processing core 105. The first write channel 115 is in communication with a first diagnostic circuit 120 to generate a diagnostic code corresponding to data being written to the shared memory resource 30. The first processing domain 100 also includes a first read channel 125 receiving data from the memory controller 20. The first read channel 125 is also in communication with the first diagnostic circuit 120 to generate a diagnostic code corresponding to data being read from the shared memory resource 30. A first compare circuit 130 is in communication with both the first read channel 125 and the first diagnostic circuit 120 to compare the diagnostic code generated when writing the data to the diagnostic code generated when reading the data. The second processing domain 200 includes a second write channel 215 receiving data from the second processing core 205. The second write channel 215 is in communication with a second diagnostic circuit 220 to generate a diagnostic code corresponding to data being written to the shared memory resource 30. The second processing domain 200 also includes a second read channel 225 receiving data from the memory controller 20. The second read channel 225 is also in communication with the second diagnostic circuit 220 to generate a diagnostic code corresponding to data being read from the shared memory resource 30. A second compare circuit 230 is in communication with both the second read channel 225 and the second diagnostic circuit 220 to compare the diagnostic code generated when writing the data to the diagnostic code generated when reading the data.

Although illustrated as separate circuits within the respective processing domains, it is contemplated that circuits may be combined in whole or in part with other circuits. For example, the diagnostic circuit 120, 220 and the compare circuit 130, 230 may be formed as a single circuit. The separate circuits are utilized for ease of illustration and for ease of discussion of various functions performed during a read or write between the processor 10 and the shared memory resource 30. Similarly, each channel 115, 125, 215, 225 is illustrated as a separate communication channel. The separate channels are illustrated for ease of illustration and discussion of the communication along each channel. It is contemplated that a single communication bus may be provided for each processing domain 100, 200 where a single processing bus includes both the respective read and write channel for the corresponding processing domain. It is further contemplated that a single communication bus may be provided between the processor 10 and the memory controller 20 and that a suitable bus interface is included on the processor 10 to route communication between each processing domain and the memory controller. According to still another embodiment of the invention, it is contemplated that each processor core 105, 205 may be implemented on a separate processor rather than as a multi-core processor, where each of the separate processors writes to the shared memory controller 20 and shared memory 30.

In operation, each processing domain 100, 200 is able to detect memory errors related to data written to the shared memory resource 30 by the respective processing domain. For convenience, the process will be discussed with respect to the first processing domain 100. This is not intended to be limiting and it is understood that the second processing domain 200 or still additional processing domains may be configured to execute the same steps to detect a memory error for data written to the shared memory resource 30 by the corresponding processing domain.

Figure 2:
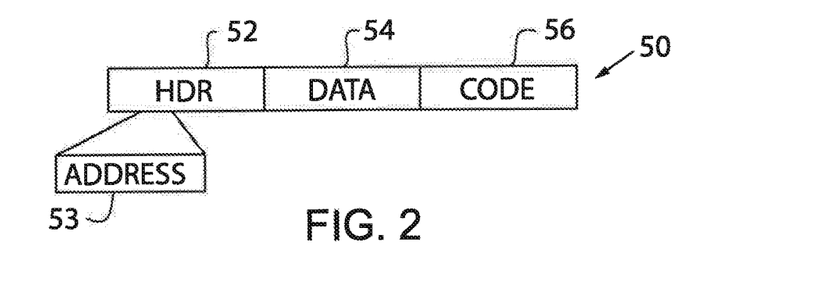
FIG. 2 is a block diagram representation of data being written by one core of the processor illustrated in FIG. 1.
Figure 3:
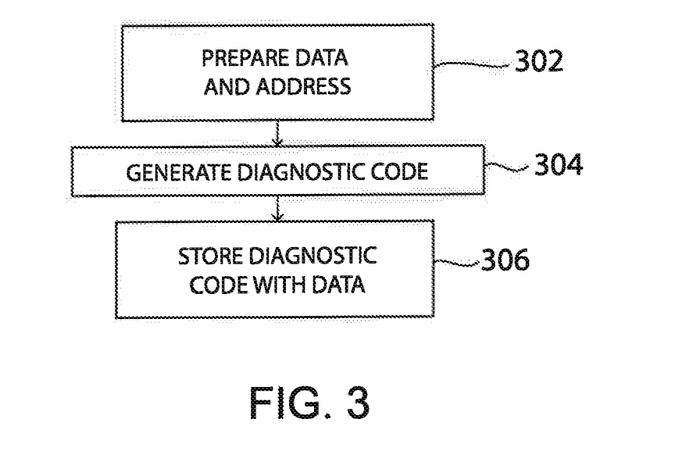
FIG. 3 is a flow diagram illustrating the steps for writing data to a shared memory resource by one of the cores in the processor of FIG. 1 according to one embodiment of the invention.

Turning next to FIG. 3, steps for writing data to the shared memory resource 30 are illustrated. At step 302, the data and address are prepared by the processing core 105 for writing to the shared memory resource 30. With reference also to FIG. 2, an exemplary data packet 50 is illustrated which includes a header 52, data 54 to be written, and a diagnostic code 56. The address 53 at which the data 54 is to be written is included in the header information. This data packet 50 is intended to be exemplary only and not limiting. It is contemplated that the header 52 may include only an address 53 at which the data 54 is to be written. Optionally, the header may also include, for example, a source, indicating to the memory controller 20 from which processing domain 100 the data is being sent, or other control commands and or status flags to manage the read and write process between each processing domain 100 and the shared memory resource. According to still another embodiment of the invention, an address bus, separate from a data bus, may be provided between each processing domain 100 and the memory controller 20, where the address 53 at which the data 54 is to be written within the shared memory resource 30 is provided on the address bus by the processor core 105 and the data 54 is provided on the data bus by the processor core 105.

With reference again to FIG. 3, the processing domain 100 next generates a diagnostic code 56 for the data to be written to the shared memory resource 30, as shown in step 304. The diagnostic circuit 120 receives the data 54 and address 53 at which the data is to be written. These may be provided in a single data packet 50 or via separate buses within the processing domain 100. The diagnostic circuit 120 is then configured to generate a diagnostic code as a function of the data 54 and of the address 53 at which the data is to be written. It is contemplated that the data 54 may include, for example, between sixteen and one hundred twenty-eight (16-128) bits. The address may similarly be defined by a sixteen to one hundred twenty-eight (16-128) bit memory location. The length of the data 54 and the length of the address 53 are defined by the shared memory resource 30 and/or the memory controller 20 used to transfer the data 54 between the processing domain 100 and the shared memory resource. The data 54 and address 53 are provided to the diagnostic circuit and passed through a suitable algorithm to generate the diagnostic code 56. The diagnostic code may be generated via a hash algorithm, where the hash algorithm is configured to map a set of data values to a set of code values with a high probability that a change in the data values will result in a change in the code generated. As previously indicated, the diagnostic code 56 may be a CRC checksum, and the algorithm may be any suitable algorithm to generate the CRC checksum. According to still other embodiments, the diagnostic code 56 may be generated by an Error Correcting Code (ECC) or a Secure Hash Algorithm (SHA).

It is further contemplated that a unique identifier for each processing domain 100 may be included with the data 54 and the address 53 to further identify the data 54 as having been written to the shared memory resource 30 by a particular processing domain 100. According to one embodiment of the invention, one bit of the address 53 or of the data 54 to be stored to the shared memory resource 30 may be used to define the unique identifier. If there are only two processing domains, as illustrated in FIG. 1, the highest address bit may be used to define a particular processing domain. The first processing domain 100 may be assigned zero (0) as an identifier, and the second processing domain 200 may be assigned one (1) as an identifier. If, for example, a thirty-two (32) bit address 53 is utilized, the processing core 105 may write an address to the lower thirty-one (31) bits. The upper bit may be tied to a logical zero for the first processing domain 100 and to a logical one for the second processing domain 200 such that the address is always defined as a function of the processing domain. Optionally, each processing core 105 may be configured to set the upper bit to the respective identifier as it writes the remaining bits of the address. Similarly, two bits may be reserved for unique identifiers if there are four processing domains and so on for a greater number of processing domains. According to still another option, a separate data byte may be defined in which up to two hundred fifty-five unique codes may be defined for separate processing domains. According to yet another option, the source of the data 54, defining one of the processing domains 100, may be included in the header 52 and may serve as the unique identifier. The separate data byte may be passed to the algorithm generating the diagnostic code in tandem with the data 54 and the address 53, such that the CRC is determined as a function of the unique identifier, the data, and the address at which the data is to be written.

According to yet another aspect of the invention, the unique identifier may be a unique algorithm selected for each processing domain 100. When each processing domain 100 passes the data 54 and address 53 to the algorithm, a different diagnostic code 56, or checksum, would be generated for the processing domain according to the selected algorithm. As a result, identical data being written to the same address would still generate a different diagnostic code 56 for each processing domain 100. Thus, the processing domain 100 could verify that data read back from the shared memory resource 30 was, in fact, written by that processing domain, as will be discussed in more detail below.

Referring again to FIG. 3, the diagnostic code 56 is written to the shared memory resource 30 along with the data 54 at the desired address 53, as shown in step 306. According to one embodiment of the invention, the diagnostic circuit 120 appends the diagnostic code 56 to the data 54 and transmits both the data 54 and the diagnostic code 56 to the memory controller 20 via a data bus. The address 53 may be passed to the memory controller 20 either directly from the processing core 105 or via the diagnostic circuit 120 on an address bus. Optionally, the address 53 is passed first to the diagnostic circuit 120, for example, in a header 52, and the data packet 50 is passed as a single object from the diagnostic circuit 120 to the memory controller 20. Once the memory controller 20 has received the address 53, data 54, and diagnostic code 56, the memory controller 20 manages storing the data 54 and the diagnostic code 56 in the shared memory resource 30.

Figure 4:
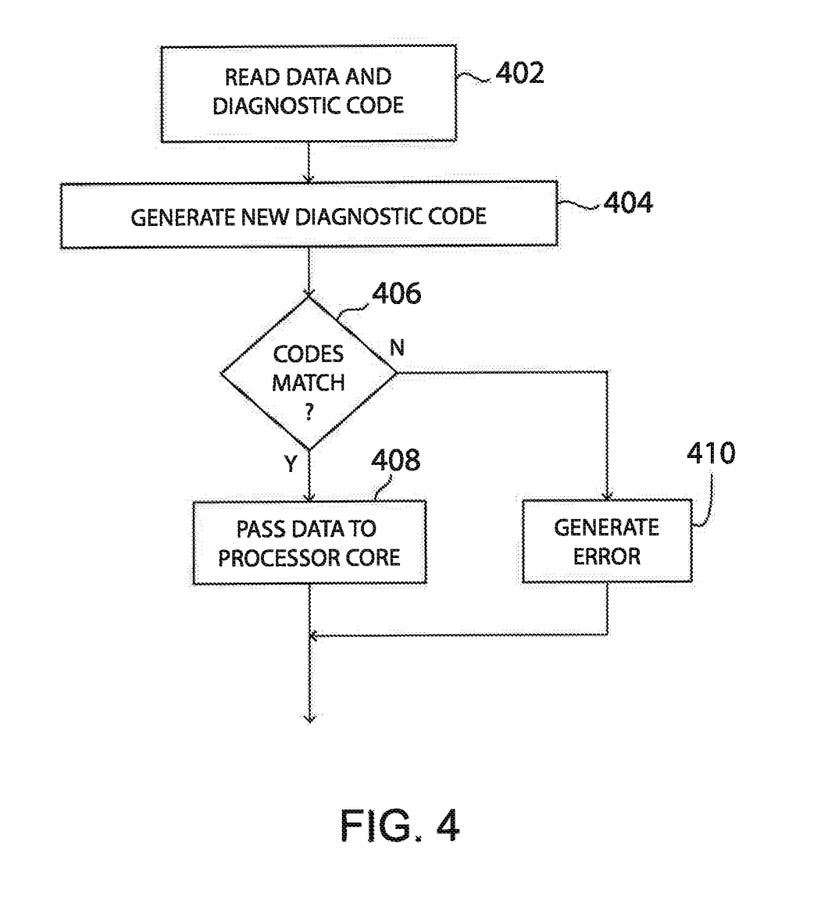
FIG. 4 is a flow diagram illustrating the steps for reading data from a shared memory resource by one of the cores in the processor of FIG. 1 according to one embodiment of the invention.

Turning next to FIG. 4, steps for reading data from the shared memory resource 30 are illustrated. At step 402, the processing domain 100 issues a read request to the memory controller 20. The read request identifies a memory address 53 from which the processing domain 100 wishes to read data 54. The memory controller 20 manages the data access with the shared memory resource 30 and provides the requested data 54 from the shared memory resource 30. When the memory controller 20 reads the data 54, the diagnostic code 56 corresponding to the data 54 is also read. The data 54 and diagnostic code 56 are stored in consecutive bytes of memory and, therefore, a read of the shared memory resource 30 defines the desired address 53 and requests a length of data to be read that is sufficient to return both the data 54 and the diagnostic code 56 which was previously stored with the data 54.

During the read process, the processing domain 100 performs a check on the data read back from the shared memory resource 30 to verify that it corresponds to the data originally written. When the data 54 and diagnostic code 56 are transferred from the shared memory resource 30 to the processing domain 100 by the memory controller 20, the read channel 125 is configured to split the data 54 and the diagnostic code 56 from each other for separate processing. The read channel 125 may, for example, connect the portion of the data bus on which the data 54 is transmitted to the diagnostic circuit 120 and the portion of the data bus on which the diagnostic code 56 is transmitted to a compare circuit 130. As shown in step 404, another diagnostic code is generated during the read process. The diagnostic circuit 120 utilizes the same algorithm used during the write process to generate the new diagnostic code. The diagnostic circuit 120 receives the data 54 read from the shared memory resource 30 by the memory controller 20. The diagnostic circuit 120 may also receive the desired memory address 53 from which the data 54 was read directly from the processing core 105. The same address may be passed both to the diagnostic circuit 120 and to the memory controller 20 during the read request to avoid potential errors in the address being introduced while reading the data. The diagnostic circuit 120 is also aware of the unique identifier corresponding to the processing domain 100. Whether the unique identifier is part of the memory address, a separate bit or byte embedded within the data, or a unique algorithm used to generate the diagnostic code, the diagnostic circuit 120 utilizes the unique identifier to generate the diagnostic code in an identical manner during the read process as it does during the write process. As a result, the two diagnostic codes should be identical.

After generating the second diagnostic code during the read process, the diagnostic circuit 120 passes the second diagnostic code to the compare circuit 130. As shown in step 406, the compare circuit 130 is configured to determine whether the original diagnostic code, obtained from the shared memory resource 30 is the same as the new diagnostic code generated during the read process. If the two diagnostic codes match, the data 54 which was read from the shared memory resource 30 is verified as matching the data which was originally written and, as shown in step 408, the data is then passed to the processing core 105 for subsequent use by the application or control program which originally initiated the read request. If, however, the two diagnostic codes do not match, the compare circuit 130 generates an error, as shown in step 410 and the processor core 105 takes action based on receiving an error message rather than upon receiving the requested data.

If the two diagnostic codes do not match, this could be an indication of an error occurring at a number of different steps between the microprocessor 10 and the shared memory resource 30. For example, an error may occur in the data being written to or read from the shared memory resource. If the data does not match between a write and a read, different diagnostic codes will be generated. Because two processing domains 100, 200 are sharing a single memory controller, the potential exists for an error in an address line during a write resulting in one processing domain 100 overwriting a memory address reserved for the other processing domain 200. However, when the second processing domain 200 attempts to read data from that address, the diagnostic code which was saved with the data was generated as a function of a different address. Thus, when the data is read back, the second processing domain 200 generates a different diagnostic code, using the address at which the first processing domain erroneously wrote to rather than the address at which the data was intended to be stored. Thus, the second processing domain is aware that the data stored in that memory location is not the same data as was previously written to that address by the second processing domain.

If one processing domain 100 detects that an error occurred in reading data from the shared memory resource 30, the processing domain 100 that detected the error may notify the other processing domain 200 of the error. It is contemplated that a separate communication bus or dedicated signal lines may exist between the two processing domains 100, 200 by which such an error notification may be transmitted.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method for detecting a memory error, the method comprising the steps of:
    writing first data to a first memory address in a shared memory resource from a first processing domain;
    generating a first diagnostic code with the first processing domain as a function of the first data and of the first memory address;
    appending the first diagnostic code to the first data such that the first diagnostic code is written in the shared memory resource with the first data;
    reading the first data and the first diagnostic code from the shared memory resource back to the first processing domain;
    verifying that the first data read from the shared memory resource matches the first data written to the shared memory resource with the first processing domain;
    writing second data to a second memory address in the shared memory resource from a second processing domain;
    generating a second diagnostic code with the second processing domain as a function of the second data and of the second memory address;
    appending the second diagnostic code to the second data such that the second diagnostic code is written in the shared memory resource with the second data;
    reading the second data and the second diagnostic code from the shared memory resource back to the second processing domain; and
    verifying that the second data read from the shared memory resource matches the second data written to the shared memory resource with the second processing domain.

2. The method of claim 1 wherein the first diagnostic code is a checksum generated by passing the first data and the first memory address through a corresponding checksum algorithm.

3. The method of claim 1 wherein verifying that the first data read from the shared memory resource matches the first data written to the shared memory resource further comprises the steps of:
    generating an additional first diagnostic code with the first processing domain as a function of the first data and the first memory address with the first processing domain as the first data is read from the shared memory resource;
    comparing the first diagnostic code read from the shared memory resource to the additional first diagnostic code with the first processing domain; and
    verifying that the first data read from the shared memory resource matches the first data written to the shared memory resource when the first diagnostic code read from the shared memory resource matches the additional first diagnostic code.

4. The method of claim 3 wherein the first processing domain generates a memory error when the first diagnostic code read from the shared memory resource does not match the additional first diagnostic code.

5. The method of claim 1 wherein the first processing domain and the second processing domain both use a single memory controller for writing the first data and the second data, respectively, to the shared memory resource.

6. The method of claim 1 wherein the first processing domain includes a first unique identifier when generating the first diagnostic code and the second processing domain includes a second unique identifier when generating the second diagnostic code.

7. The method of claim 6 wherein:
    the step of verifying that the first data read from the shared memory resource matches the first data written to the shared memory resource with the first processing domain further comprises using the first unique identifier to verify the first data was written by the first processing domain, and
    the step of verifying that the second data read from the shared memory resource matches the second data written to the shared memory resource with the second processing domain further comprises using the second unique identifier to verify the second data was written by the second processing domain.

8. The method of claim 1 wherein verifying that the first data read from the shared memory resource matches the first data written to the shared memory resource further comprises the steps of:
    generating another first diagnostic code with the first processing domain as a function of the first data and the first memory address with the first processing domain as the first data is read from the shared memory resource, comparing the first diagnostic code read from the shared memory resource to the other first diagnostic code with the first processing domain, and verifying that the first data read from the shared memory resource matches the first data written to the shared memory resource when the first diagnostic code read from the shared memory resource matches the other first diagnostic code; and wherein verifying that the second data read from the shared memory resource matches the second data written to the shared memory resource further comprises the steps of:

generating another second diagnostic code with the second processing domain as a function of the second data and the second memory address with the second processing domain as the second data is read from the shared memory resource, comparing the second diagnostic code read from the shared memory resource to the other second diagnostic code with the second processing domain, and verifying that the second data read from the shared memory resource matches the second data written to the shared memory resource when the second diagnostic code read from the shared memory resource matches the other second diagnostic code.

9. The method of claim 8 wherein:

the first processing domain generates a first memory error when the first diagnostic code read from the shared memory resource does not match the other first diagnostic code, and the second processing domain generates a second memory error when the second diagnostic code read from the shared memory resource does not match the other second diagnostic code.

10. The method of claim 9 wherein:

the first processing domain is in communication with the second processing domain, the first processing domain notifies the second processing domain of the first memory error, and the second processing domain notifies the first processing domain of the second memory error.

11. An apparatus for detecting a memory error, comprising:

a shared memory resource configured to store first data and second data;

a memory controller configured to:
  manage reading the first data and the second data from the shared memory resource, and
  manage writing the first data and the second data to the shared memory resource;

a first processing domain in communication with the memory controller, wherein the first processing domain is configured to:
  write the first data to the shared memory resource via the memory controller,
  generate a first diagnostic code corresponding to the first processing domain, the first data to be written, and to a memory address at which the first data is to be written, and
  append the first diagnostic code to the first data as it is written to the shared memory resource; and a second processing domain in communication with the memory controller, wherein the second processing domain is configured to:
  write the second data to the shared memory resource via the memory controller,
  generate a second diagnostic code corresponding to the second processing domain, the second data to be written, and to a memory address at which the second data is to be written, and
  append the second diagnostic code to the second data as it is written to the shared memory resource, wherein either the first or the second processing domain is further configured to:
  read the first or second data from the shared memory resource via the memory controller, and
  verify that the first or second data read from the shared memory resource matches the first or second data written to the shared memory resource.

12. The apparatus of claim 11, wherein the first processing domain includes a first unique identifier when generating the first diagnostic code and the second processing domain includes a second unique identifier when generating the second diagnostic code.

13. The apparatus of claim 12 wherein:

the first processing domain is further configured to verify that the first data read from the shared memory resource matches the first data written to the shared memory resource using the first unique identifier; and the second processing domain is further configured to verify that the second data read from the shared memory resource matches the second data written to the shared memory resource using the second unique identifier.

14. The apparatus of claim 13 wherein:

the first processing domain is configured to verify that the first data read from the shared memory resource by the first processing domain matches the first data written to the shared memory resource by the first processing domain by:
  generating another first diagnostic code with the first processing domain as a function of the first data read, the memory address from which the first data was read, and the first unique identifier as the first data is read from the shared memory resource, and
  verifying that the first data read from the shared memory resource by the first processing domain matches the first data written to the shared memory resource by the first processing domain when the first diagnostic code read from the shared memory resource matches the other first diagnostic code; and the second processing domain is configured to verify that the second data read from the shared memory resource by the second processing domain matches the second data written to the shared memory resource by the second processing domain by:
  generating another second diagnostic code with the second processing domain as a function of the second data read, the memory address from which the second data was read, and the second unique identifier as the second data is read from the shared memory resource, and
  verifying that the second data read from the shared memory resource by the second processing domain matches the second data written to the shared memory resource by the second processing domain when the second diagnostic code read from the shared memory resource matches the other second diagnostic code.

15. The apparatus of claim 14 wherein:
the first processing domain generates a first memory error when the first diagnostic code read from the shared memory resource does not match the other first diagnostic code, and
the second processing domain generates a second memory error when the second diagnostic code read from the shared memory resource does not match the other second diagnostic code.

16. The apparatus of claim 15 wherein:
the first processing domain is in communication with the second processing domain,
the first processing domain notifies the second processing domain of the first memory error, and
the second processing domain notifies the first processing domain of the second memory error.

17. A method for detecting a memory error, the method comprising the steps of:
writing data to a memory address in a shared memory resource via a shared memory controller from either a first processing domain or a second processing domain;
appending a diagnostic code to the data as the data is written by either the first processing domain or the second processing domain, wherein the diagnostic code is generated as a function of the data, the memory address, and either the first or second processing domain from which it is written;
reading the data from the memory address in the shared memory resource with the corresponding processing domain that wrote the data to the memory address; and
verifying that the data read from the memory address in the shared memory resource matches the data written to the memory address using the diagnostic code appended to the data.

18. The method of claim 17 wherein:
the first processing domain includes a first unique identifier;
the first processing domain generates the diagnostic code as a further function of the first unique identifier;
the second processing domain includes a second unique identifier; and
the second processing domain generates the diagnostic code as a further function of the second unique identifier.

19. The method of claim 18 wherein:
the first processing domain verifies that the data read from the memory address in the shared memory resource matches the data written to the memory by:
generating a first additional diagnostic code as a function of the data read, the memory address from which the data is read, and of the first unique identifier, and
verifying that the data read from the memory address in the shared memory resource matches the data written to the memory when the first additional diagnostic code matches the diagnostic code which was stored in the shared memory resource; and
the second processing domain verifies that the data read from the memory address in the shared memory resource matches the data written to the memory by:
generating a second additional diagnostic code as a function of the data read, the memory address from which the data is read, and of the second unique identifier, and
verifying that the data read from the memory address in the shared memory resource matches the data written to the memory when the second additional diagnostic code matches the diagnostic code which was stored in the shared memory resource.

\* \* \* \* \*